UNITED STATES PATENT OFFICE.

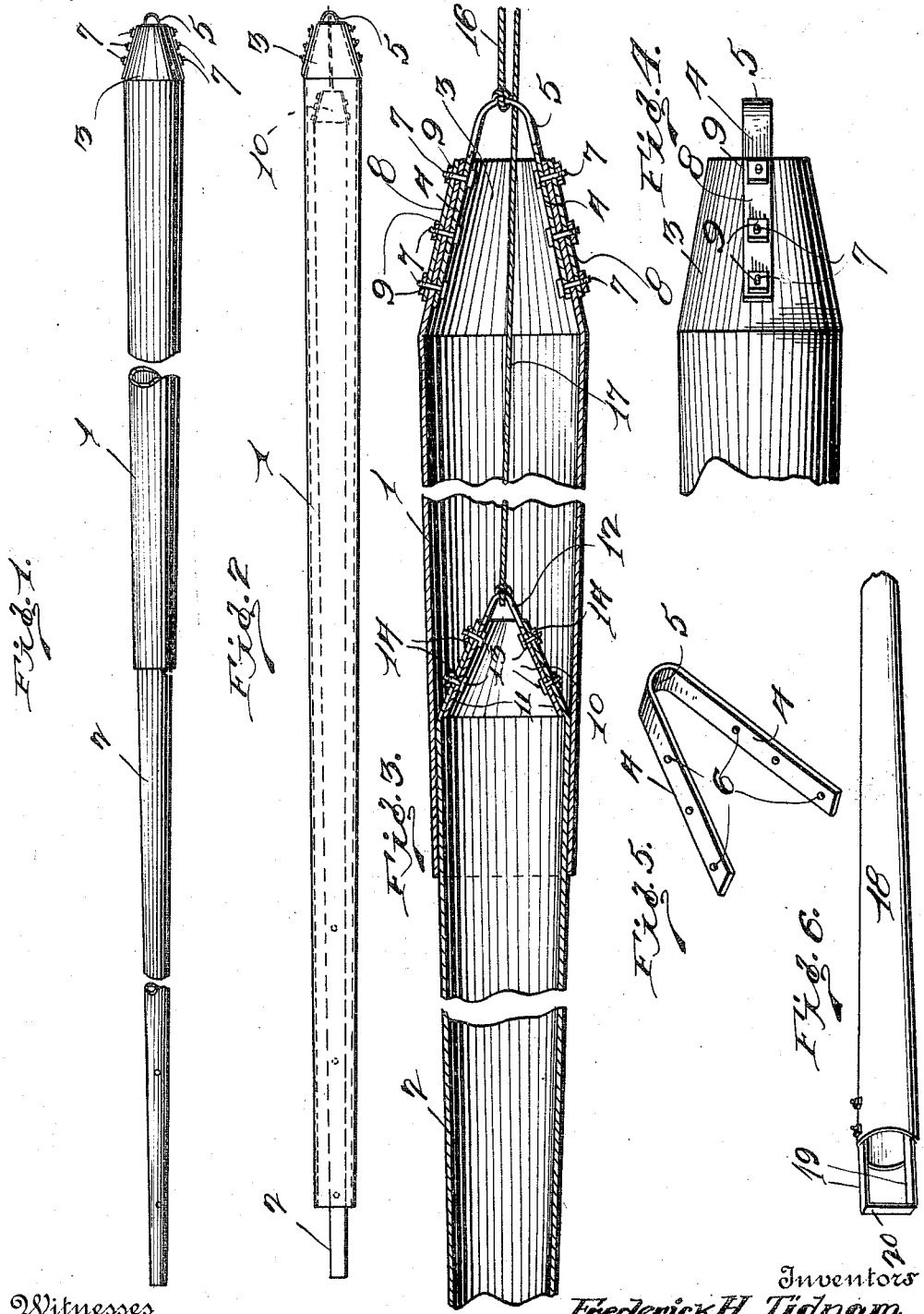

FREDERICK H. TIDNAM AND JOHN N. GRAVES, OF OKLAHOMA, OKLAHOMA.

TELESCOPING CORE FOR FORMING PLASTIC POLES OR POSTS.

973,239.  Specification of Letters Patent.   Patented Oct. 18, 1910.

Application filed January 25, 1910. Serial No. 540,047.

*To all whom it may concern:*

Be it known that we, FREDERICK H. TIDNAM and JOHN N. GRAVES, citizens of the United States, residing at Oklahoma City, in the county of Oklahoma and State of Oklahoma, have invented certain new and useful Improvements in Telescoping Cores for Forming Plastic Poles or Posts, of which the following is a specification, reference being had therein to the accompanying drawing.

This invention relates to mold cores, and the principal object of the same is to provide a core that is especially adapted for use in connection with post molds, said core being of hollow tapering formation and provided with a handle extension that facilitates the necessary manipulations of the same which are incidental to placing the same in, or removing it from, a mold.

In carrying out the objects of the invention generally stated above it will be understood, of course, that the essential features thereof are necessarily susceptible of changes in details and structural arrangements, certain practical embodiments of which are shown in the accompanying drawings, wherein:—

Figure 1 is a view in side elevation of one embodiment of the core, the core being formed of two or more telescopically arranged sections, and being shown expanded. Fig. 2 is a similar view, the section being shown telescoped. Fig. 3 is a fragmentary vertical sectional view. Fig. 4 is a fragmentary detail view of one end of one section showing a handle thereon. Fig. 5 is a detail view of the handle. Fig. 6 is a side view of a core made in a single length.

The present invention includes, in its broad aspect, the core illustrated in the copending application of F. H. Tidnam, Serial Number 516,170 filed September 4, 1909.

Referring to said drawing by numerals, and particularly to Figs. 1, 2, 3, 4 and 5 thereof, it will be observed that the improved core comprises an elongated hollow tapering body that is formed of two or more sections 1—2, said sections having a telescoping engagement. Section 1 is the outer section and has its rear end substantially cone-shaped as indicated at 3 and receives therein the divergently arranged fastening arms 4 of a handle 5, said arms and handle being integral and are preferably formed of strap metal. Said arms are provided with regularly spaced bolt openings 6 for the fastening bolts 7 that also pass through said cone-shaped end 3 and through external reinforcing strips 8 carried by said end, and are detachably locked in fastening positions by the nuts 9. The inner section 2 is similarly provided with a cone-shaped rear end 10 to which the arms 11 of handle 12 are fastened by means of bolts 13 and nuts 14, said end being also equipped with reinforcing strips 15 through which bolts 13 pass. Cables 16—17 are provided for telescoping the mold sections, cable 16 having one end connected to the handle of section 1, and cable 17 having one end connected to the handle of section 2, said cable 17 extending through the rear end of section 1.

In use, the core is placed within a mold in an expanded condition, and after it has performed its functions, section 2 is drawn into section 1 by means of its cable 17, after which both sections may be readily withdrawn from the mold by means of both cables.

In Fig. 5 the core is in a single length and of an elongated hollow tapering formation, as indicated at 18. The rear end of the body having the parallel arms 19 of the handle 20 detachably secured to its inner surface by means of the nuts and bolts 21—22. The handle and arms are integral and preferably formed of strap metal. A cable may be used for withdrawing the core from the mold if desired, said cable being obviously used as is shown in connection with the outer section 1, Fig. 3.

It will be seen that in both forms of the invention the core may be readily manipulated to position it within a mold or to remove it therefrom, the handle being of such a nature that it serves equally as well as a handgrip as an attaching medium for a cable.

What we claim as our invention is:—

1. A mold comprising a plurality of telescopic sections, the rear end of each of said sections being tapered, a handle secured to the rear end of each of said sections, and a cable connected to each of said handles for removing said mold from a post.

2. A mold comprising a plurality of telescopic sections, the rear end of each of said sections being tapered, substantially V-shaped handles, means for detachably securing one of said handles within each of said tapered portions, and a cable secured to each of said handles for drawing one of said sections within the other.

In testimony whereof we hereunto affix our signatures in presence of two witnesses.

FREDERICK H. TIDNAM.
JOHN N. GRAVES.

Witnesses:
F. W. CASE,
WALTER BOZARTH.